US006942438B1

(12) United States Patent
Deguise

(10) Patent No.: US 6,942,438 B1
(45) Date of Patent: Sep. 13, 2005

(54) KEYWAY CUTTER TOOL AND METHOD

(76) Inventor: Scott L. Deguise, 6637 W. Summerdale Cir., Yipsilanti, MI (US) 48197

( * ) Notice: Subject to any disclaimer, the term of this patent is extended or adjusted under 35 U.S.C. 154(b) by 0 days.

(21) Appl. No.: 09/843,440

(22) Filed: Apr. 26, 2001

(51) Int. Cl.[7] .............................. B23D 7/00; B23D 7/06; B23D 3/02

(52) U.S. Cl. ...................... 409/293; 409/304; 409/319; 409/326; 409/336; 409/346; 409/347; 407/118; 407/104; 83/875

(58) Field of Search .................... 409/307, 304, 409/293, 289, 319, 326, 327, 336, 297–299, 303, 313, 329–333, 259, 345, 346, 347, 348; 407/117–118, 102–104; 83/875

(56) References Cited

U.S. PATENT DOCUMENTS

| 469,813 | A | * | 3/1892 | Dahlgren et al. ........... 144/137 |
| 1,025,735 | A | * | 5/1912 | Bosredon .................. 407/118 |
| 1,135,157 | A | * | 4/1915 | Clarke ..................... 409/346 |
| 1,179,753 | A | * | 4/1916 | Parrock .................... 407/118 |
| 1,319,250 | A | * | 10/1919 | Sarlandt ................... 409/346 |
| 1,912,666 | A | * | 6/1933 | Swanson ................... 407/118 |
| 2,154,576 | A | | 4/1939 | Morton |
| 2,352,132 | A | * | 6/1944 | Southwell ................. 409/346 |
| 2,674,028 | A | * | 4/1954 | Kontra .................... 407/118 |
| 2,744,451 | A | * | 5/1956 | Lee ....................... 407/117 |
| 3,688,643 | A | * | 9/1972 | Hubertus Prieur et al. .. 409/289 |
| 4,106,377 | A | * | 8/1978 | Owen et al. ............... 409/336 |
| 4,154,145 | A | | 5/1979 | Bishop |
| 4,404,882 | A | * | 9/1983 | Mock ..................... 409/303 |
| 4,626,153 | A | | 12/1986 | Ergert et al. |
| 5,150,996 | A | | 9/1992 | Thoroughman |
| 5,185,917 | A | * | 2/1993 | Kremen ................... 409/293 |
| 5,765,976 | A | * | 6/1998 | Ozaki et al. .............. 409/293 |
| 5,779,400 | A | * | 7/1998 | Fountaine ................ 407/103 |
| 5,876,163 | A | | 3/1999 | Nemeth et al. |
| 6,095,730 | A | | 8/2000 | Asa |

* cited by examiner

*Primary Examiner*—Erica Cadugan
(74) *Attorney, Agent, or Firm*—Young & Basile, PC

(57) ABSTRACT

An apparatus and method for forming a keyway in a workpiece is provided. The apparatus includes a shank and cutter, the shank and cutter immovably associated with respect to each other during the keyway forming operation. The apparatus is engageable with a computer numeric controlled machine. The method of forming a keyway in a workpiece includes a reciprocating, chiseling motion for removing layers of material from the workpiece.

18 Claims, 2 Drawing Sheets

KEYWAY CUTTER TOOL AND METHOD

FIELD OF THE INVENTION

The present invention provides a tool and method for forming a keyway in a workpiece; specifically, the invention provides a tool for chiseling a keyway in a workpiece and a method for using the tool with a computer numeric controlled machine.

BACKGROUND OF THE INVENTION

In a workpiece having a keyway slot fabrication of the parts generally involves at least two steps. The first step is to turn the part to form the desired shape of the part. This first step is usually completed by a lathe. The second step of the process is to broach the keyway slot. In order to do this, the part is moved from the lathe to a broaching machine. Moving a part from one machine to another involves spending significant time unloading the part from the first machine and loading the part into the second machine. It would be desirable to eliminate the time required to move a part from a lathe to a broaching machine when a part having a keyway slot is formed.

SUMMARY OF THE INVENTION

The present invention provides an apparatus and method for forming a keyway in a workpiece. The apparatus is a cutting tool having a shank and a cutter immovably associated with respect to each other during the cutting operation. The cutting tool is engageable with a computer numeric controlled machine capable of moving the tool in a reciprocating, chiseling motion to form a keyway in a workpiece by chiseling layers of material from the workpiece with cutting tools in successive passes of the cutting tool of the workpiece. The cutting tool of the present invention can eliminate the need to have two machines for turning and broaching a part.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Various embodiments of the present invention are shown throughout the figures. These figures include common elements in different structural configurations. Common elements are designated with a common base numeral and differentiated by alphabetic designation.

The present invention provides tool 10 for forming a keyway in workpiece. The tool 10 includes a shank 14 and a cutter 16. The shank 14 and cutter 16 are immovably associated with respect to each other during the keyway forming process. The tool 10 is engageable with a computer numeric controlled machine, or CNC machine, during the keyway forming process.

Figure 1:
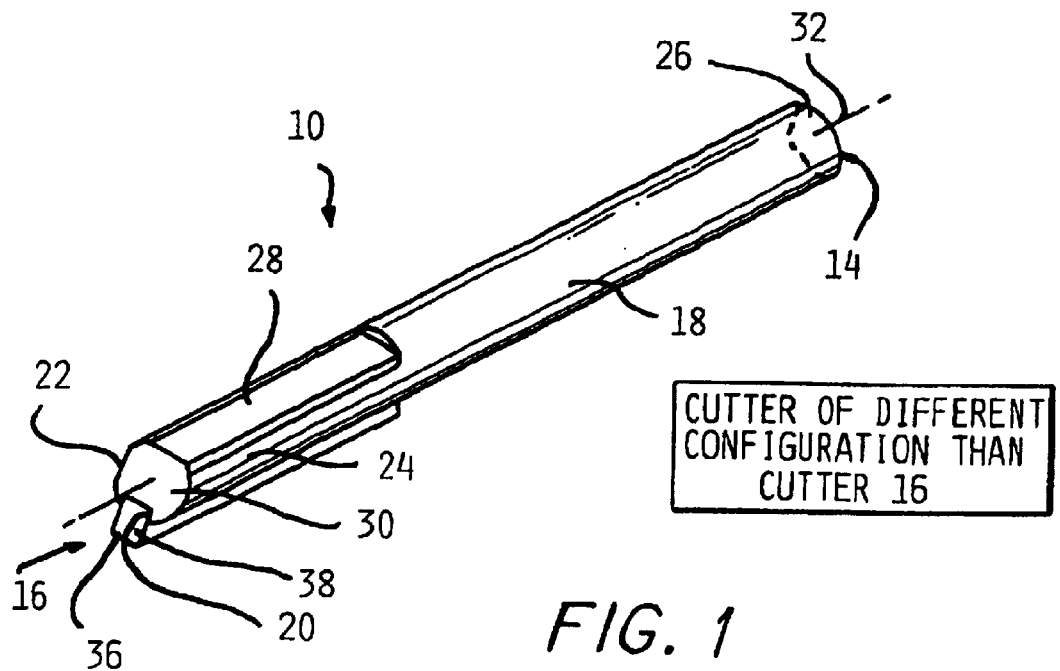
FIG. 1 is a isometric view of a cutting tool according to the present invention having a shank and cutter welded together.
Figure 2:
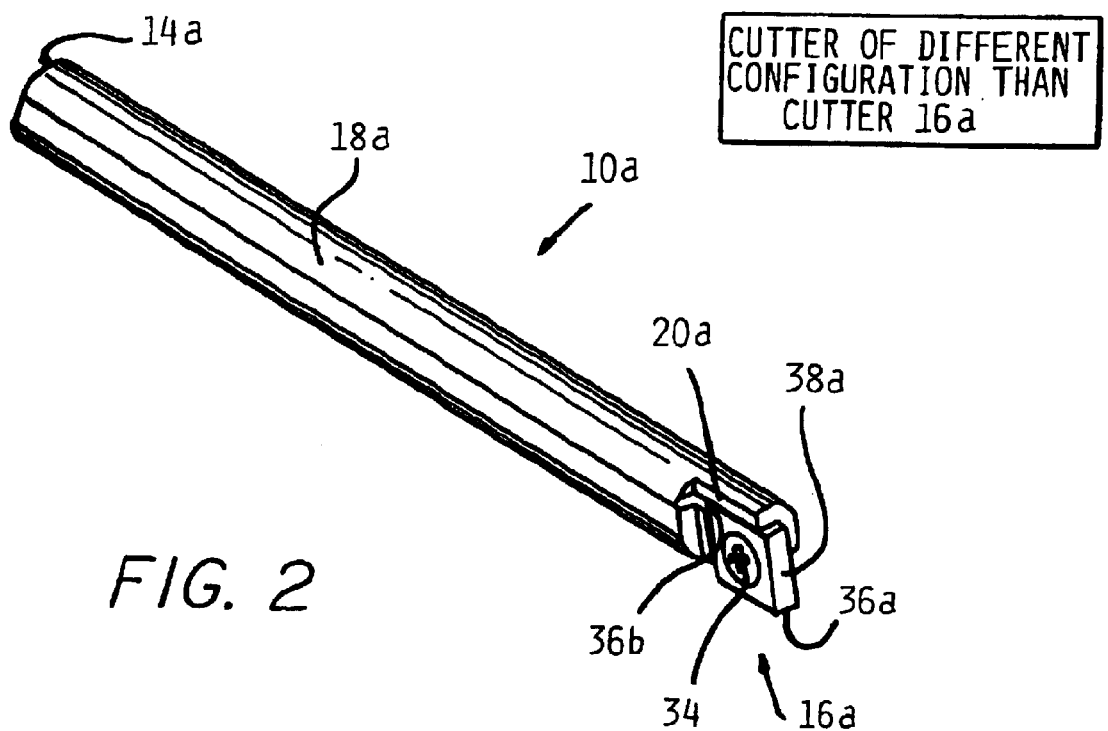
FIG. 2 is a cutting tool according to the present invention having a shank and cutter connected with a fastener.

As shown in FIGS. 1 and 2, the shank 14 has a length and is substantially circular in cross-section. However, the shank 14 can be rectangular, pentagonal, hexagonal, octagonal, elliptical, or irregular in cross-section without departing from the sprit and scope of the present invention. The cross-section of the shank 14 can be selected based on the configuration of the workpiece. Specifically, the cross-section of the shank 14 can be sized and shaped to conform to the size of an aperture in a workpiece in which the keyway is formed. The shank 14 is fabricated from M2 or M3 steel. The shank 14 includes a landing surface 22. When the tool 10 is engaged with a computer numeric controlled machine, engaging means of the computer numeric controlled machine, such as screws, can be pressed against the landing surface 22 to firmly position the tool 10 with respect to the computer numeric controlled machine. The shank 14 can have a second landing surface to enhance the engagement of the tool 10 with a computer numeric controlled machine. The landing surface 22 extends from a front end 24 of the shank 14 to a rear end of the shank 14. However, the landing surface 22 can extend less than an entire length of the shank 14. Furthermore, a landing surface 22 is not required so long as means are provided to engage the tool 10 with the CNC machine. The shank 14 also includes a slot 28 to enhance the fit between the shank 14 and an aperture in a workpiece. For example, a slot 28 can enable a shank 14 otherwise larger than the aperture of a workpiece to fit at least partially in the aperture. The slot 28 extends from a front end 24 of the shank 14 a desired length. The desired length can correspond to a length that the shank 14 pierces the aperture of the workpiece. A slot 28 is not required of a tool 10 according to the present invention. The shank 14 also includes a face 30, positioned at the front end 24 of the shank 14, to promote the removal of material from the workpiece 12. As the tool 10 passes over the workpiece 12, a chip 42 is formed and can be deflected by the face 30. The face 30 is angled relative to a longitudinal axis 32 of the shank 14. The degree of the angle of the face 30 with respect to the axis 32 is greater than 90°, preferably 105°.

The shank 14 includes a slot 20. The slot 20 receives the cutter 16. The slot 20 is sized to correspond to the size of the cutter 16 to promote a tight fit between the cutter 16 and the shank 14. Two alternative embodiments of the slot are disclosed in FIGS. 1 and 2, respectively. In FIG. 1, the slot 20 is shallow and long with respect to the body 18. In FIG. 2, the slot 20a is deep and short. Either embodiment can be employed in a tool according to the present invention; a more important characteristic than the shape of the slot is the tightness of the fit between the shank 14 and the cutter 16.

The cutter 16 includes a cutting edge 36 and a face 38. The cutter 16 is fabricated from M2 or M3 steel and can be ground 0.004 inch over 0.250 inch to compensate for tool wear. The cutter 16 can be shaped to promote longer tool life. For example, as shown in FIG. 1, the cutter 16 can be relatively longer so that the cutting edge 36 can be sharpened multiple times, each sharpening resulting in removal of material from the cutter 16. Alternatively, the cutter 16a can be relatively shorter and include two cutting edges, 36a and 36b, as shown in FIG. 2. In the operation of tool 10a, when the cutting edge 36a becomes inoperative or ineffective, the cutter 16a can be disassociated with respect to the shank 14a and re-associated with cutting edge 36b rotated and in position to chisel the workpiece 12. The cutting edge 36 of the tool 10 can be ground from 12° to 24°. The cutter 16 includes a face 38 to promote chip deflection. As a chip is formed at the cutting edge 36 during a keyway forming operation, the chip rides up the face 38. When the cutter 16 and the shank 14 are associated with respect to each other, the face 38 can be substantially co-planar with the face 30 of the shank 14. However, the face 28 and face 30 can be positioned on different parallel or non-parallel planes without departing from the spirit and scope of the present invention. The face 38 can be angled with respect to a longitudinal axis 32 of the shank 14. In particular, the face 38 can be at an angle of between one hundred degrees and one hundred and ten degrees, preferably one hundred and five degrees. The cutter 16 can be coated with any coating known in the art to promote tool life. For example, the cutter 16 can be coated with titanium carbide, titanium nitride or aluminum oxide.

The cutter 16 and the shank 14 can be joined in any method known in the art. In particular, as shown in FIG. 1, the cutter 16 and the shank 14 are welded together. TIG welding can be used to weld the cutter 16 and shank 16, each fabricated from M2 or M3 steel. Alternatively, the cutter 16a and shank 14a can be immovably associated with respect to each other with a fastener 34. The use of fastener 34 for joining the cutter 16a and shank 14a can be advantageous in that the slot 20a can receive a plurality of differently configured cutters.

Prior to the current invention, a workpiece having a keyway was fabricated in at least two steps, each step requiring a different machine. In a first step, the workpiece is turned to produce a desired external shape of the workpiece and a desired aperture. The turning operation is typically performed by a lathe. In a second step, the workpiece is subjected to a keyway forming operation, typically accomplished with a broaching machine. The shortcomings with the fabrication of a workpiece having a keyway, as taught by the art, include the maintenance costs associated with two machines, the labor costs associated with having to fixture a workpiece with respect to two machines, and the inherent difficulties associated with broaching including stuck broaches, galling and pickup, broach breakage, chatter, drifting or misalignment of tool during cutting stroke, and rings in the broached hole. The present invention provides a tool and method that substantially reduces these problems concurrently. Specifically, the present invention eliminates the necessity of forming a keyway in a workpiece with a broaching machine.

Figure 3:
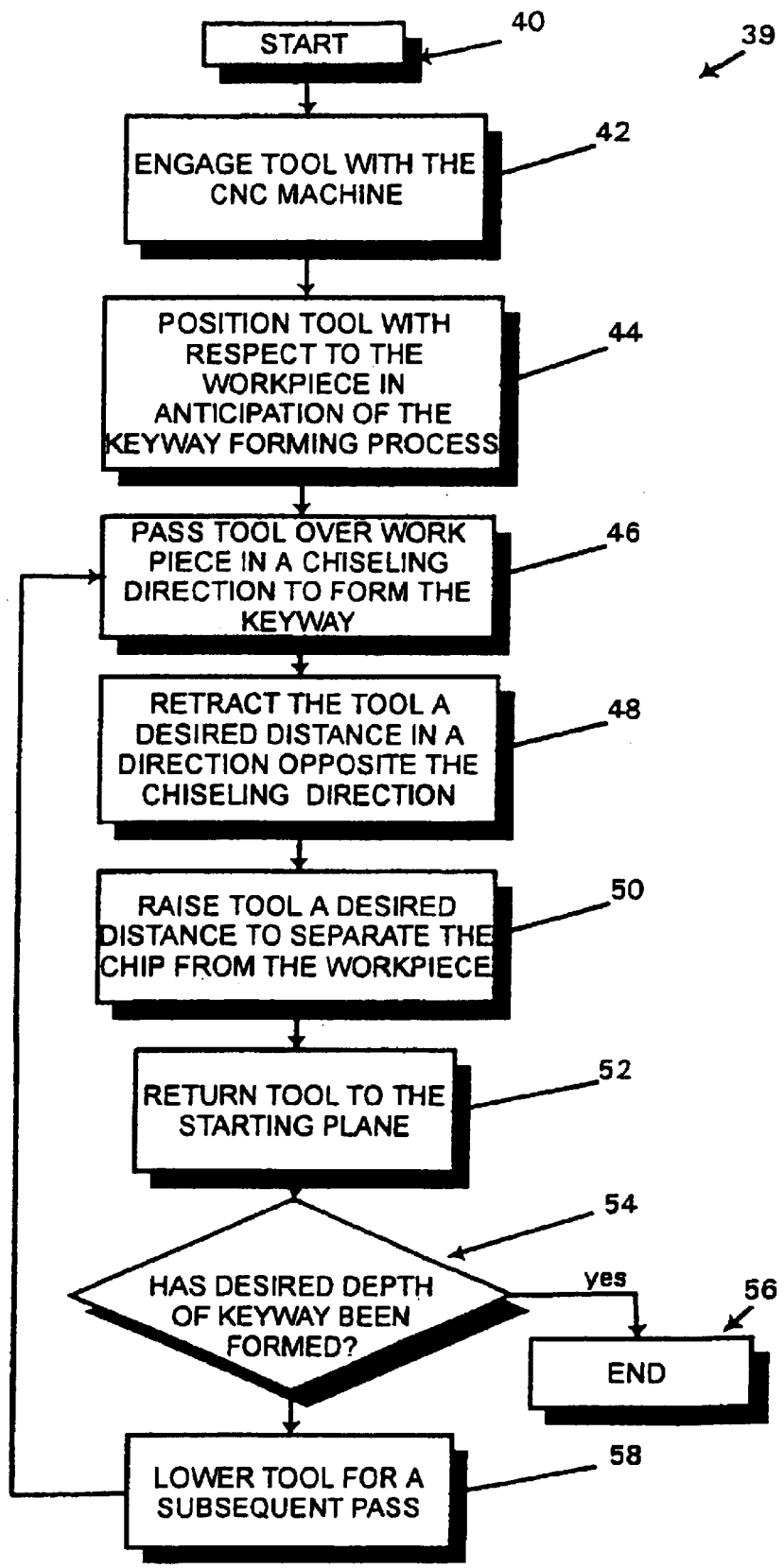
FIG. 3 is a flow diagram illustrating the steps for forming a keyway in a workpiece according to the present invention.

In operation, the tool 10 is operably engaged with a computer numeric controlled machine. The computer numeric controlled machine is programmable to move the tool 10 in a reciprocating, chiseling motion to gradually remove material from the workpiece. After the workpiece has been turned, it can remain at the turning machine. The steps for forming a keyway are shown in the simplified flow diagram of FIG. 3. The method 39 starts at step 40. Step 42 engages the tool 10 of the present invention with the CNC machine. Screws associated with the CNC machine can be turned to press against a landing surface 22 and immovably associate the tool 10 with respect to the CNC machine. However, any means known in the art can be utilized for engaging the tool 10 with the CNC machine without departing from the spirit or scope of the present invention. In step 44, the CNC machine positions the tool with respect to the workpiece in anticipation of the keyway forming process. The position of the tool 10 is defined in a starting plane. The starting plane is defined in an x and y coordinate system. For each pass through or over the workpiece, the tool 10 will begin the pass at the same x position in the starting plane. However, the tool will begin each pass at a relatively lower y position than the previous pass to deepen the keyway being formed in the workpiece. Step 46 passes the tool over the workpiece 12 to form the keyway. The cutting edge 36 is drawn through the workpiece in a chiseling direction to form a chip of material. The distance the tool 10 travels in the chiseling direction can be any desired distance including an entire length of the workpiece. The ideal thickness of the chip or, in other words, the depth of the cut can be determined using well known formulas with knowledge of the material of the workpiece, the material of the cutter 16, the speed of the tool 10 and the desired life of the tool 10; these formulas will not be discussed herein. In the present invention, the preferred tool speed in two hundred and fifty feet per minute (250 ft./min.). The preferred depth of cut is two and one half thousandths inch (0.0025 in.) per pass. The keyway can be formed in aperture of a workpiece or in an external surface of a workpiece. The keyway can be axially tapered with respect to the workpiece. For example, in a keyway having an axial taper, the keyway would be deeper at one position than at a second position along the keyway. Step 48 retracts the tool 10 a desired distance to draw the cutting edge 36 away from the point of connection between the chip and the workpiece. The direction in which the tool 10 is retracted is opposite of the cutting direction. The distance of retraction can be two thousandths inch (0.002 in.). Retracting the cutting edge 36 in this manner promotes longer tool life and facilitates the subsequent step of separating the chip from the workpiece. The method 39 of the present invention can be performed without step 48. For example, if the keyway if formed along the entire length of the workpiece, the chip can be separated from the workpiece if the tool is moved a distance in the chiseling direction greater than the length of the workpiece. In such an operation, retraction of the tool 10 is unnecessary. Step 50 moves the tool 10 relative to the workpiece to separate the chip from the workpiece. The method 39 of the present invention can be performed without step 50. For example, if the keyway if formed along the entire length of the workpiece, the chip can be separated from the workpiece if the distance traveled in the chiseling direction is greater than the length of the workpiece. If the chip is not separated from the workpiece by travel of the tool 10 in the chiseling direction, raising the tool 10 in step 50 causes the chip to separate from the workpiece. Step 52 returns the tool 10 to the starting plane. Step 54 monitors the depth of the keyway formed in the workpiece. If the desired depth of the keyway has been achieved, the method 39 ends at step 56. If the desired depth has not been achieved, the method 39 continues to step 58 and the tool 10 is lowered. The tool 10 is lowered in the y direction in preparation of a subsequent pass through the workpiece. The distance the tool 10 is lowered can correspond to depth of cut of two and one half thousandths inch (0.0025 in.) in the subsequent pass. The distance the tool 10 is lowered in step 58 contemplates any distance the tool 10 was raised in step 50. After the tool 10 is lowered, the method 39 continues to step 46. The steps of the method 39 can be programmed in the CNC machine and be performed in rapid succession. The programming of GNC machines is well known and will not be discussed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for forming a keyway in a fixed workpiece comprising:

a shank having a longitudinal axis and engaged with a computer numeric controlled machine that moves the shank along a first path in a first direction with respect to the workpiece during a keyway forming process, the shank having a first deflection face transverse to the longitudinal axis that deflects a chip of material formed in the keyway forming process when the shank is moved in the first direction; and a cutter immovably associated with the shank, the cutter having at least one cutting edge that is directed through the workpiece to form the chip of material at least partially disassociated with the workpiece and to define the keyway when the shank is moved along the first path, the cutter having a second deflection face extending in the same general direction as the first deflection face and that deflects the chip of material formed in the keyway forming process.

2. The apparatus of claim 1 wherein the cutter is mounted in a slot formed in the shank.

3. The apparatus of claim 1 wherein the cutter and the shank are welded together.

4. The apparatus of claim 1 further comprising:

a fastener for immovably associating the cutter and shank with respect to each other during the keyway forming process.

5. The apparatus of claim 1 wherein the at least one cutter edge includes a plurality of cutting edges, each cutting edge selectively mountable one at a time with respect to the shank for forming the keyway.

6. The apparatus of claim 1 wherein the shank further comprises:

a slot at a first end of the shank, the slot engageable with an aperture of the workpiece when the keyway is formed in the aperture.

7. The apparatus of claim 1 wherein the first and second deflection faces are substantially coplanar.

8. The apparatus of claim 1 wherein the second deflection face is angled relative to a longitudinal axis of the shank, the angle of the second deflection face relative to the axis being from between one hundred degrees (100°) and one hundred and ten degrees (110°).

9. The apparatus of claim 1 wherein the cutter includes:

a plurality of differently configured cutters, each cutter selectively engageable with the shank, each cutter for forming a differently configured keyway in the workpiece.

10. An apparatus for forming a keyway in a fixed workpiece comprising:

a shank having a longitudinal axis and engaged with a computer numeric controlled machine that moves the shank along a first path in a first direction with respect to the workpiece during a keyway forming process, the shank having a first deflection face transverse to the longitudinal axis that deflects a chip of material formed in the keyway forming process when the shank is moved in the first direction; and a cutter immovably associated with the shank, the cutter having at least one cutting edge that is directed through the workpiece to form the chip of material at least partially disassociated with the workpiece and define the keyway when the shank is moved along the first path with the computer numeric controlled machine, the cutter having a second deflection face extending in the same general direction as the first deflection face and that deflects the chip of material formed in the keyway forming process.

11. The apparatus of claim 10 further comprising:

a fastener for immovably associating the cutter and shank with respect to each other during the keyway forming process.

12. The apparatus of claim 10 wherein the cutter and the shank are welded together.

13. A method for forming a keyway in a fixed workpiece comprising:

moving a shank having a longitudinal axis and engaged with a computer numeric controlled machine with moving means along a first path in a first direction with respect to the workpiece during a keyway forming process, the shank having a first deflection face transverse to the longitudinal axis that deflects a chip of material formed in the keyway forming process when the shank is moved in the first direction; and directing a cutter having at least one cutting edge through the workpiece so that the at least one cutting edge forms the chip of material at least partially disassociated with the workpiece and defines the keyway when the shank is moved along the first path, the cutter immovably associated with the shank during the keyway forming process and directed by the moving means, the cutter having a second deflection face extending in the same general direction as the first deflection face and that deflects the chip of material formed in the keyway forming process.

14. The method of claim 13 wherein the moving step further comprises the step of:

moving the shank with the computer numeric controlled machine.

15. The method claim 13 further comprising the step of:

engaging the cutter and the shank by positioning the cutter in a slot formed in the shank and welding the cutter to the shank.

16. The method claim 13 further comprising the step of:

engaging the cutter and the shank with a fastener.

17. A method for forming a keyway in a workpiece comprising the steps of:

moving a shank engageable with a computer numeric controlled machine having a moving means alone a first path in a first direction with respect to the workpiece, the shank having a first deflection face operable to deflect a chip of material formed in the keyway forming process; and directing a cutter having at least one cutting edge through the workpiece in a chiseling step so that the at least one cutting edge forms the chip of material at least partially disassociated with the workpiece and defines the keyway when the shank is moved along the first path, the cutter immovably associated with the shank and directed by the moving means, the cutter having a second deflection face for deflecting the chip of material formed in the keyway forming process;

reversing movement of the shank relative to the first direction a predetermined distance away from a point of connection between the chip and the workpiece with the moving means;

moving the shank along a second path in a second direction extending generally transverse to the first direction with respect to the workpiece to dislodge the chip formed during the chiseling step with the moving means; and returning the shank to a starting plane including the first direction of the movement after moving the shank in the second direction with the moving means.

18. The method claim 17 further comprising the steps of:

lowering the shank relative to the workpiece after the shank has been returned to the starting plane; and moving the shank to form a second chip of material at least partially disassociated with respect to the workpiece and to deepen the slot with the moving means.

* * * * *